Feb. 6, 1968    S. E. PETERSON    3,367,494
SMALL POTATO ELIMINATOR STRUCTURE
Filed July 22, 1965    2 Sheets-Sheet 1
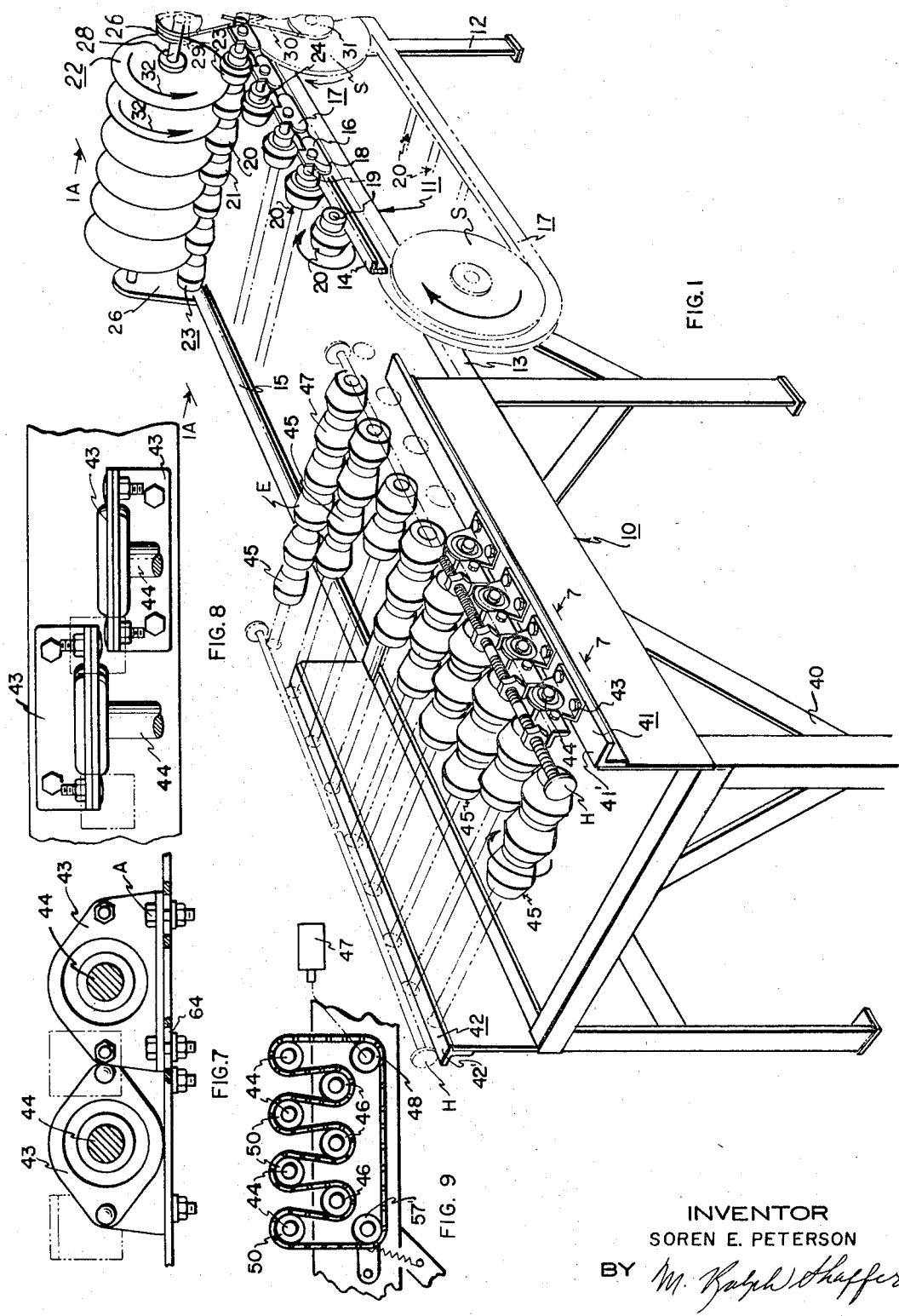
INVENTOR
SOREN E. PETERSON
BY *M. Ralph Shaffer*
HIS ATTORNEY

INVENTOR
SOREN E. PETERSON
BY
HIS ATTORNEY

United States Patent Office 3,367,494
Patented Feb. 6, 1968

3,367,494
SMALL POTATO ELIMINATOR STRUCTURE
Soren E. Peterson, 1649 West 3300 South,
Salt Lake City, Utah 84119
Filed July 22, 1965, Ser. No. 473,975
6 Claims. (Cl. 209—106)

ABSTRACT OF THE DISCLOSURE

The present invention provides improved small potato eliminator structure wherein plural conveyor rolls may be mutually and variable spaced apart an equivalent distance with respect to each other and to a reference roll. Suitable, serpentine drive means is provided to rotate all of the conveyor rods together in a common direction and at the same time.

---

The present invention relates to potato seed cutting machines and, more particularly, to a new and improved machine designed to receive potatoes and eliminate small ones not intended for seed cutting, and to advance the remaining potatoes into disc cutting knives so that the potatoes may be cut into seed of appropriate size.

Accordingly, a principal object of the present invention is to provide a new and improved potato seed cutting machine.

A further object of the present invention is to provide a new and improved potato seed cutting machine wherein, in the eliminating portion of the machine, the roll means thereof may be mutually spaced at variable distances.

A further object is to provide potato seed cutting machine wherein the bed therein forms cradles or pockets for advancing potatoes toward chosen cutting means.

An additional object is to provide means whereby traveling rolls or rollers can be used to be both translated and rotated, the latter at a rapid speed, for producing a desired cutting effect at the cutting mechanism of the machine.

A further object is to provide a new and useful means for transporting and cutting potatoes into seed for planting purposes.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a perspective view, fragmentary in nature and partially shown in phantom line for convenience of illustration, of a potato seed cutting machine incorporating the principles of the present invention. For purposes of clarity, the drive means for the machine is omitted in FIGURE 1.

FIGURE 7 is a side elevation taken along the line 7—7 in FIGURE 1, wherein the journal bearing mounting structure is staggered in order to accommodate the close positioning of adjacent roller shafts.

FIGURE 8 is a plan view of representative bearing structure shown in FIGURE 7.

FIGURE 9 is a schematic of a pulley drive used for the table 10 structure.

Figures 1A, 2:
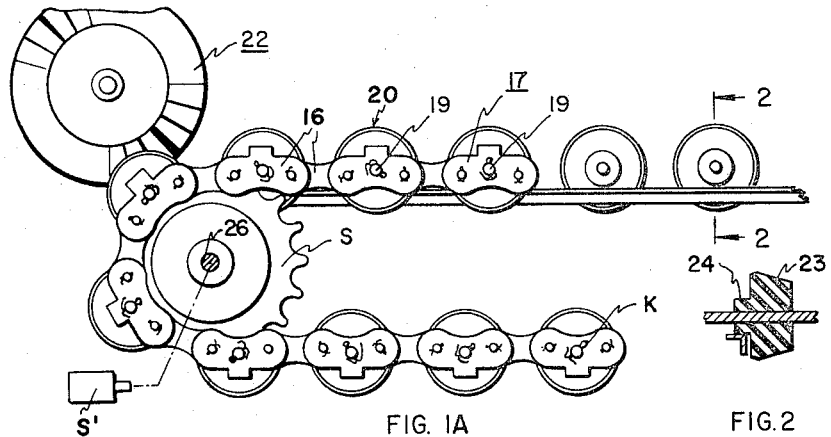
FIGURE 1A is an enlarged, fragmentary, side elevation of the forward portion of the machine as taken along the line 1A—1A in FIGURE 1.
FIGURE 2 is a fragmentary section taken along the line 2—2 in FIGURE 1A.

In the drawings the structure of the present invention is shown to include a receiving, sorting, and alignment table 10 and also a conveyer table 11. For convenience, the latter will be discussed first.

Table 11 includes leg or other supporting structure 12 and a supported frame 13 which includes roller rails 14 and 15. Links 16 of looped chain 17, see FIGURES 1 and 1A, are provided with apertures 18 for receiving shafts 19 of the plural traveling roll means 20. Each of the traveling roll means 20, in addition to including respective shafts 19, also include plural, medial roll members 21 which are mutually spaced for the reception of disc knives 22 therebetween and end rolls 23. Each of the end rolls 23 include outwardly-facing roller portions 24 which are reduced in diameter so as to increase the over-all speed of revolvement of each of the traveling roll means. Chains 17 are disposed at opposite sides of the table and journal or otherwise secure the shafts 19 as indicated. Plural (four) sprockets S are provided for revolvingly securing the opposite extremities of the looped chains 17, respectively. These sprockets S as seen in FIGURES 1 and 1A, intercooperate with the two mutually-spaced chains 17 for revolving the same. A suitable power source S', schematically illustrated in FIGURE 1A, is coupled to a sprocket shaft 26 for driving the two forward sprockets S and, hence, the chains 17. Revolvement of the chains produce a translation of shafts 19 and, as a consequence, a rolling translation of the outermost roll members 23. Since roll members 21 and 23 are preferably pressed onto the individual shafts 19 and the shafts themselves are journaled within their chain link mountings, the several traveling roll means 20 progress toward disc knives 22 in a translational fashion, with the individual traveling roll means 20 revolving in a clockwise direction with respect to the upper course seen in FIGURE 1A.

There are a variety of ways, of course, of securing the shafts 19 to the chains 17. One will be to include cotter keys K as illustrated at one point only for convenience, see FIGURE 1A, in the FIGURE 1 structure.

Structure 26 is used to journal the disc knives 22 generally above the traveling roll means 20. In particular disc knives 22 are mounted as by a keyed connection to shaft 28, and the latter is journaled to the structure 26. Shaft 28 is provided with a keyed pulley 29 which cooperates with the crossed belt 30 and sprocket-keyed pulley 31 for rotating the knives in a generally counter-clockwise direction in accordance with the positioning of the arrows 32.

Figure 3:
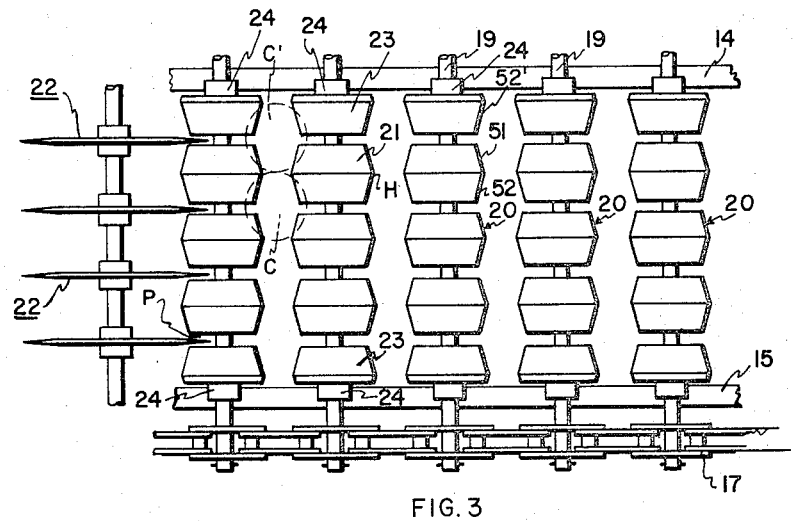
FIGURE 3 is a plan view of the FIGURE 1A structure.

The configuration of the individual roll members 21 and 23 is best understood with reference to FIGURE 3. Again, it is to be understod that the roll members 21 and 33 are pressed onto or otherwise secured to the shafts as indicated. If there is not a fixed relationship relative to the individual shafts and the several roll members indicated, then the rolls should be keyed together in some manner where shafts 19 affix to the chain 17.

In any event, rotation of roll members 23 as is produced through the friction contact of reduced diameter portions 24 and rails 14 and 15 results in the simultaneous rotation of shafts 19 and all roll members 21 and 23. It is noted that the outer periphery of roll members 21 is tapered from a central peripheral high point H in opposite directions so that, in effect, potato cradles C are formed between four adjacent roll members 21 (or two roll members 21 in combination with the two adjacent roll members 23 as at C'). These pockets or cradles C and C' serve to nestle, transversely, potatoes along their longitudinal axis for movement toward knives 22.

In operation, in connection with FIGURES 1, 1A, 2 and 3, potatoes dropped on the bed of conveyer table 11, i.e. onto the several, traveling roll means, achieve final alignment in pockets C and C' and are advanced, by virtue of the loop-translation of the shafts of the traveling rolls, toward the knives 22. The latter rotate in a counter-clockwise direction, see FIGURE 1, so as to aid in the cutting of potatoes as they advance toward the disc knives. It will be seen with reference to FIGURES 1 and 3 that the rolls themselves are spaced apart by distances P in order that the several disc knives may be positioned therebetween and revolve in such a position. The tapered surfaces 51, 52, and 52' of the individual traveling rolls aid in defining pockets C and C', for example, for receiving the potatoes in transverse alignment as they are advanced toward the disc knives. The reduced diameter portions 24 of the end roll members aid in increasing the angular speed of rotation of the shafts and their rollers to place the potatoes, in rather quick, transverse alignment. Preferably the rollers will be made of a resilient material such as neoprene or rubber and have sufficient frictional qualities for alignment with the cutting blades or knives 22.

We shall now turn our attention to the beginning or feed portion of the structure which has been heretofore termed as a receiving, sorting, and initial alignment table 10. Table 10 includes a frame structure 40 provided with a pair of rails 41 and 42 having respective upper surfaces 41' and 42'. Mounted upon these upper surfaces and slidable therealong in a manner hereinafter indicated are plural bearing mounts 43. For convenience of illustration but four appear in FIGURE 1. It will be understood that they will be provided for all of the shafts 44 (and a corresponding fixed bearing mount for intermediate shaft 44') of each revolving roll means 45. Thus, the journal bearing mounts 43 associated with shafts 44 will be slidably affixed to the horizontal surface presenting rails 41 and 42 and accommodate all of the shafts 44, at both ends of the shafts, which are in nominal horizontal alignment and mutually spaced as indicated. Mounted upon the shafts 44 are plural revolving rolls 47 which are either slightly spaced apart or are pushed together. Their peripheries are much the same as those indicated with relation to rolls 21 in FIGURE 3 of the drawings.

Again, the shafts 44 are mounted in the bearing mounts 43 as seen in FIGURE 1 and FIGURE 9. The frame may accommodate the mounting thereto at one side thereof of journaled idler pulleys 46, spring-loaded idler pulley 57', and drive pulley 48 the latter of which is driven by power source 47. A chain or belt 49 may be used to intercouple in any desired serpentine manner, as indicated in FIGURE 9, the pulleys (or sprockets) 50, 46, 48 and spring-loaded idler 57. The reason for the spring-loaded idler pulley 57' is to take up tension and yet to provide for the adjustment of spacing between the revolving roll means 45. Here is the essence of this portion of the invention. It has been before mentioned that the journal mounts 43 on both sides of the machine are slidably mounted upon rails 41 and 42, see FIGURE 7. Now it is important that, for sorting purposes, the spacing may be adjustably increased or decreased in corresponding degrees between revolving roller means 45. This is preferably done by a single adjustment, and the adjustment means as illustrated in FIGURES 1 and 4-6.

Figures 4, 5, 6:
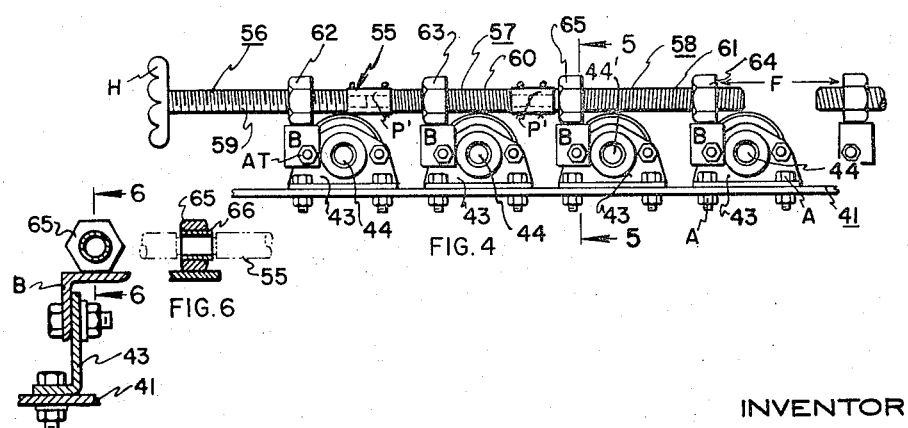
FIGURE 4 is a side elevation of shaft spacing adjustment structure utilized in the present invention; the structure shown in FIGURE 4 is representative of four units of structure which cooperatively serve in shaft adjustment as shown in FIGURE 1.
FIGURE 5 is an enlarged section taken along line 5—5 in FIGURE 4.
FIGURE 6 is a fragmentary section, partially shown in phantom line, and taken along the line 6—6 in FIGURE 5.

The structure in this regard is best illustrated in FIGURE 4. In FIGURE 4 a composite adjustment shaft means 55 is composed of coaxially aligned, mutually joined threaded shafts 56, 57, and 58. The threads 59 of shaft 56 have twice the pitch but the same direction of advancement as threads 60 of shaft 57. Threads 61 of shaft 58 are oppositely threaded but of the same pitch relative to threads 60. Nuts 62, 63, and 64 are threaded on the respective shaft portions as indicated. Nut 65 is an idler nut, may or may not include bearing 66 (see FIGURE 6), and allows the composite shaft 55 to rotate therein in a fixed place and without relative advancement, either to the right or to the left, of idler nut 65 and the intermediate shaft 44' with which the latter is associated. The nuts 62–65 are fixedly secured as by welding to their respective brackets B which in turn are secured by attachments AT to the respective slidable bearing mounts 43. If desired, the bearing mount 43 associated with nut 64 can be fixed in position. It will be seen, therefore, that, in operation, the rotation of a respective composite shaft means 55, as through the rotational displacement of handle H, will produce a certain relative displacement of nut 63, either toward or away from nut 65, and a corresponding displacement in the same direction of twice this magnitude of nut 62, in a reverse displacement relative to that of nut 64. Absolute displacement, relative to rail 41, is thus determined where nut 64 is fixedly disposed with respect to the frame (through the tightening of attachments A in FIGURE 4). Hence, it will be immediately seen that any particular displacement of handle H, either in a clockwise or counter-clockwise direction, will vary the spacing between the nut 62–65, and hence between the several shafts 44, all of this while the shaft associated with nut 64 will remain in the same place. It is apparent then that four such units, two on each side, may be used as generally indicated in FIGURE 1 so that (permanently) equal shaft spacing between shafts 44 can be adjusted as needed to drop out those potatoes which are not intended for advancement toward conveyer table 11. It has been found in practice that the shafts 44 of the several revolving roll or roller means 45 need not themselves translate; rather, all that is sufficient is that the rollers revolve in a direction such that the uppermost periphery of the uppermost half thereof always revolves toward the loading end of conveyer table 11.

In practice each of the shaft segments relative to the structure shown in FIGURE 4 may include sleeves P' which can be pinned to adjacent shaft portions, or keyed by cotter pins. The bearing mounts are spaced (see FIGURE 4) or can be offset with respect to each other as illustrated in FIGURE 7 and FIGURE 8; in either event the rails 41 and 42 will be provided with pluralities of slots 64 to accommodate for the slidable adjustment of interspacing between shafts 44 which results because of the rotations of handles H. Attachments A may be used to complete the slidable affixing of the journal mounts 43 for slidably retaining the journal mounts to their respective rails 41 and 42.

The way the two adjustment units work in concert on each side of the machine, again, is as follows: The bearings 43 of each set which are proximate each other are tightened down securely to the frame. (The spacing F, see FIGURE 4, never varies but merely serves as dead space.) Rotation of the handles H of the two units on a respective side of the machine may be chosen so that an equal spacing exists between the revolving roll means of one adjustment set and the revolving roll means of the remaining adjustment set. This variable spacing feature permits the proper elimination of small potatoes below a selected size, through their dropping through (between) the revolving roll means 45, so that only the remaining ones are fed, in initial transverse alignment, for cutting into seed via the table 11.

In practice, handles H of each of the adjustment units on both sides of the machine will be adjusted simultaneously or as near simultaneously as is practical. The reason for the inclusion of the drive mechanism shown in FIGURE 9 becomes clear. It is seen that the adjustment in spacing necessarily lengthens or shortens the length of chain or belt between sprockets or pulleys 46 and 50, for example; thus, the inclusion of spring-loaded idler 51 accommodates the variation of spacing between shafts 44.

In operation, the potatoes will be dumped onto the receiving end (nearest the viewer) of the machine shown in FIGURE 1 and from this point the potatoes will advance to the discharge end E of the equipment, there to fall onto the bed of table 11 as is defined by the traveling roll means 20. From this point they advance by the conveying mechanism theretofore described into and through the disc knives 22, leaving the machine as cut seed to be caught into bins or sacks for storage, transport, or immediate use.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a small potato eliminator structure, a plurality of mutually-spaced parallel shafts, including an intermediate shaft, nominally arranged in a load-supporting position, translatable bearing means respectively journalling said shafts on opposite sides of said intermediate shaft, fixed bearing means journalling said intermediate shaft, means for revolving said shafts coupled thereto, potato-conveying roll means respectively fixedly disposed upon each of said shafts for revolvement therewith, and single threaded adjustment means, engaging said bearing means journalling specific ones of those of said shafts on opposite sides of said intermediate shaft, for varying in mutual correspondence the spacing between adjacent ones of said shafts and said intermediate shaft such that said shafts are mutually equally spaced for any given adjustment of said threaded means.

2. Structure according to claim 1 wherein said threaded adjustment means comprises a composite shaft means having plural threaded portions of differing threaded character, plural nut means respectively threadedly engaging at least some of said portions, said translatable bearing means being affixed to respective ones of said nut means.

3. Structure according to claim 2 wherein the thread pitch of a threaded portion, of said composite shaft means on one side of said intermediate shaft is one-half the thread pitch of said shaft at an adjacent portion thereof, said composite shaft including a threaded portion which is oppositely threaded with respect to the prior-mentioned threaded portions, said oppositely threaded portion threadedly engaging at least one of said translatable bearing means disposed on the opposite side of said fixed bearing means to that of the relative disposition of said prior-mentioned threaded portions.

4. In a small potato eliminator structure, a plurality of mutually-spaced parallel shafts nominally arranged in a load-supporting position, means for revolving said shafts coupled thereto, plural roll members disposed upon each of said shafts, and threaded means for varying in mutual correspondence the spacing between adjacent ones of said shafts such that all of said shafts are mutually equally spaced for any given adjustment of said threaded means, said shafts' revolving means comprising a power source, a drive pulley coupled to said power source, plural pulleys respectively mounted in alignment upon said shafts, idler pulleys displaced from yet mechanically disposed between said shaft pulleys, a spring-loaded adjustment pulley, and looped, elongate, drive means intercoupling said shaft pulleys, idler pulleys, and adjustment pulley in a serpentine manner and also intercoupled with said power source to be driven thereby.

5. In a small potato eliminator structure, a plurality of mutually-spaced parallel shafts, including translatable shafts on opposite sides of a fixed shaft, nominally arranged in a load-supporting position, means for revolving said shafts coupled thereto, potato-conveying roll means disposed upon each of said shafts, said roll means being mutually constructed and arranged to form potato-receiving and carrying pockets, and single threaded means for varying the spacing between adjacent ones of said shafts, including said fixed shaft, such that all of said shafts are mutually equally spaced for any given adjustment of said single threaded means.

6. In a small potato eliminator structure, a plurality of mutually-spaced parallel shafts nominally arranged in a load-supporting position, means for revolving said shafts coupled thereto, potato-conveying roll means disposed upon each of said shafts, and threaded means for varying in mutual correspondence the spacing between adjacent ones of said shafts such that all of said shafts are mutually equally spaced for any given adjustment of said threaded means, said shafts' revolving means comprising a power source, a drive pulley coupled to said power source, plural pulleys respectively mounted in alignment upon said shafts, idler pulleys displaced from yet mechanically disposed between said shaft pulleys, a spring-loaded adjustment pulley, and looped, elongate, drive means intercoupling said shaft pulleys, idler pulleys, and adjustment pulley in a serpentine manner and also intercoupled with said power source to be driven thereby.

References Cited

UNITED STATES PATENTS

| 1,163,503 | 12/1915 | Buck | 74—509 |
| 2,082,302 | 6/1937 | Ross | 209—101 |
| 2,365,822 | 12/1944 | Jones | 209—106 |
| 2,370,539 | 2/1945 | Hodecker | 209—106 |

ALLEN N. KNOWLES, *Primary Examiner.*